United States Patent [19]

Grandjean

[11] Patent Number: 4,804,175
[45] Date of Patent: Feb. 14, 1989

[54] APPARATUS FOR TEMPORARY STORAGE OF FLAT ARTICLES

[75] Inventor: Dominique Grandjean, Frahier, France

[73] Assignee: Bull, S.A., Paris, France

[21] Appl. No.: 69,104

[22] Filed: Jul. 2, 1987

[30] Foreign Application Priority Data

Jul. 3, 1986 [FR] France .................. 86 09665

[51] Int. Cl.4 ............................................. B65H 5/06
[52] U.S. Cl. ................................. 271/225; 271/176; 271/184; 271/265; 271/902
[58] Field of Search ............... 271/3.1, 176, 177, 178, 271/184, 186, 291, 189, 902, 225, 265

[56] References Cited

U.S. PATENT DOCUMENTS 4,031,402  6/1977  Dlugos .
4,486,012  12/1984 Bock ............... 271/186 X

FOREIGN PATENT DOCUMENTS

1141116  12/1962  Fed. Rep. of Germany .
1489729  10/1965  France .
2399070  2/1979   France .
8101900  11/1982  Netherlands ............... 271/186

Primary Examiner—Richard A. Schacher
Attorney, Agent, or Firm—Kerkam, Stowell, Kondracki & Clarke

[57] ABSTRACT

The invention relates to a system or apparatus intended for temporary storage of flat articles. Drive means (22A, 33) enable the articles coming from a first track (15) to be carried to a storage pocket (35). A pressure roller (51B) that is normally in contact with a removal roller (45B) is momentarily spaced apart from its position in order to enable an article stored in the pocket to be put in contact with the removal roller, so that later it is engaged in a second track (53). The pressure roller prevents an article that arrives in the pocket later from coming into contact with the removal roller, as long as the article constrained between these two rollers has not been ejected from the pocket.

10 Claims, 9 Drawing Sheets

APPARATUS FOR TEMPORARY STORAGE OF FLAT ARTICLES

FIELD OF THE INVENTION

The present invention relates to an apparatus for the temporary storage of flat articles, such as sheets of paper, checks, cards, letters or similar documents.

BACKGROUND OF THE INVENTION

Equipment for processing flat articles, such as document sheets, cards, and the like, has long been known in which the articles to be processed are introduced one by one at the entrance to a transport path. Such equipment generally comprises endless belts or rotating drive rollers, for routing the articles to an exit of the transport path, moving successively via at least two systems arranged for processing the articles. The systems may be of the type described for example in French Pat. Nos. 1,379,259 and 2,078,087. In such systems it often happens that the two processing systems operate at different processing speeds, so that if the work done by the upstream processing system is done in a shorter time than that done by the other processing system, then an article driven continuously via the transport path may quite likely arrive at the entrance to this other system before the other system has finished processing the preceding article. In such case, it is absolutely necessary to provide a buffer system for temporary storage of articles such that the articles that have been processed by the faster upstream processing system accumulate and await the opportunity to be processed by the downstream processing system. Equipment for processing articles that includes a temporary buffer storage system disposed in between two processing systems is shown for example in French Patent No. 2,379,860.

Storage apparatus intended for temporary storage of articles have also been used in certain article sorting machines. One such known sorting machine has been described in the twenty-fifth supplement, No. 76,410, to French Patent No. 1,048,767. As disclosed in the patent, the articles to be sorted are introduced one by one at an arbitrary rate at the entrance to a transport path and are stored in an intermediate buffer store from which they are then removed so as to be sent at a uniform rate and speed to a receiving station that assures the sorting of the articles. The intermediate buffer store includes a wall against which the articles that are driven by the transport path abut as they arrive in the buffer store; hence this system appears to divide this transport path into two sections or feed tracks. Accordingly, the articles to be sorted, which are introduced at the entrance to a first feed track, are routed via this track and introduced into the buffer storage, where they are then stopped by the wall as they abut it. The articles that are immobilized in this buffer storage are then removed from it one by one in the opposite direction from that in which they were fed into the system, and are then engaged at the entrance to a second feed track, which routes them to the receiving station that is intended to perform the sorting. Storage apparatus of this generic type may naturally be used in the aforementioned article processing equipment that includes at least two article processing systems, as well as in equipment that includes only a single processing system but in which the transport path is arranged to allow an article to pass twice through this single processing system. Thus a sheet printing machine is known, for example, as described in the European Patent published as No. 0029647, in which each sheet, after having passed underneath the printing mechanism once so as to be printed on one of its two sides, is oriented toward a first feed track, which transports it to an intermediate storage magazine where the sheet is then stored. A removal mechanism allows this sheet to be removed subsequently from this magazine in the direction opposite that in which it was introduced, and to be engaged in a second feed track, which moves the sheet underneath the printing device. This sheet is then printed on its other side, and after its second passage underneath the printing mechanism it is finally routed toward a receiving box.

It is often indispensable for the article that has momentarily been stored in the storage magazine and is then removed from this magazine to be routed to the processing system located immediately downstream so as to arrive beneath this second system at a precise predetermined instant. This condition cannot be met unless the removal device with which the storage system is equipped can assure that the articles contained in the storage magazine will be removed from it without any variation from one article to the other in terms of the time required to effect this removal. Furthermore, in some applications, the storage magazine must be designed so as to assure the storage of more than one article at a time, while allowing the articles so stored to be subsequently removed one at a time.

The storage apparatus additionally described in the aforementioned supplement No. 76.410 and in the aforementioned European Patent No. 0029647 meet the second of the above two conditions, but not the first. The removal device with which they are equipped includes only one endless belt, which has a coefficient of friction too low to assure that the articles placed in contact with it will be driven without sliding. Thus it may happen that these articles are removed from storage with a certain delay, which varies from one article to another, or even that they are not removed at all. In a variant embodiment described in the aforementioned supplement No. 76.410, this disadvantage does not arise because of the fact that the removal device comprises a pneumatic suction device. Nevertheless, this suction device does not provide as much satisfaction as desired, because in order for the articles to be driven properly, the negative pressure value has to be adjusted as a function of the mass and rigidity of the articles, which makes this adjustment particularly delicate.

Another form of storage apparatus has been additionally described in U.S. Pat. No. 3,416,791. This arrangement includes a pocket in which each article is momentarily stored and a removal mechanism, which comprises, first, a friction roller driven in rotation and passing across a window made in one of the internal partitions of this pocket so as to come into contact with an article stored inside it and, second, a pressure roller integrally connected to an actuating device. Normally this pressure roller is spaced apart from the friction roller, but when the actuating device is excited it is capable of being urged toward the friction roller to allow an article stored in the pocket to be constrained between the friction roller and the pressure roller and thus to be removed from the pocket.

This latter arrangement does meet the first of the two conditions given above, but it does not meet the second condition at all, because if two articles are stored in the pocket at the same time it would then be impossible for these two articles to be removed from the pocket one at a time.

OBJECT AND SUMMARY OF THE INVENTION

The present invention precisely overcomes the disadvantages of the prior art and proposes apparatus for storing articles which not only assures the storage of more than one article at a time, but allows these articles to be removed one by one, without sliding, or in other words at precise predetermined instants.

More precisely, the invention relates to apparatus for temporary storage of flat articles, such as sheets, including a storage pocket positioned facing the exit of a first article-feed track and the entrance of a second article-feed track, an adhesion-drive device contiguous with the pocket and arranged to allow an article stored in this pocket to be put in contact with this device, this device being constructed and arranged so that, upon command, it removes an article that has been applied to it from the pocket and puts this article into the second track. This apparatus is characterized in that it also includes an applicator device arranged so that, in the absence of an article in the pocket, it occupies a position of repose in which it is in contact with the drive device, but without impeding the introduction into this pocket of articles fed via the first track, and so that as soon as a single article has been introduced completely into the pocket it moves away from this position and later returns there, so as to allow this article to be applied to the drive device and to prevent another article arriving later in this pocket from coming into contact with this drive device as long as the article that is applied to this drive device has not been removed from this pocket.

The invention will be better understood and further objects and advantages thereof will become more apparent from the ensuing description, made by way of non-limiting example, taken in conjunction with the accompanying drawings.

DESCRIPTION OF THE PREFERRED EMBODIMENTS

Figure 1:
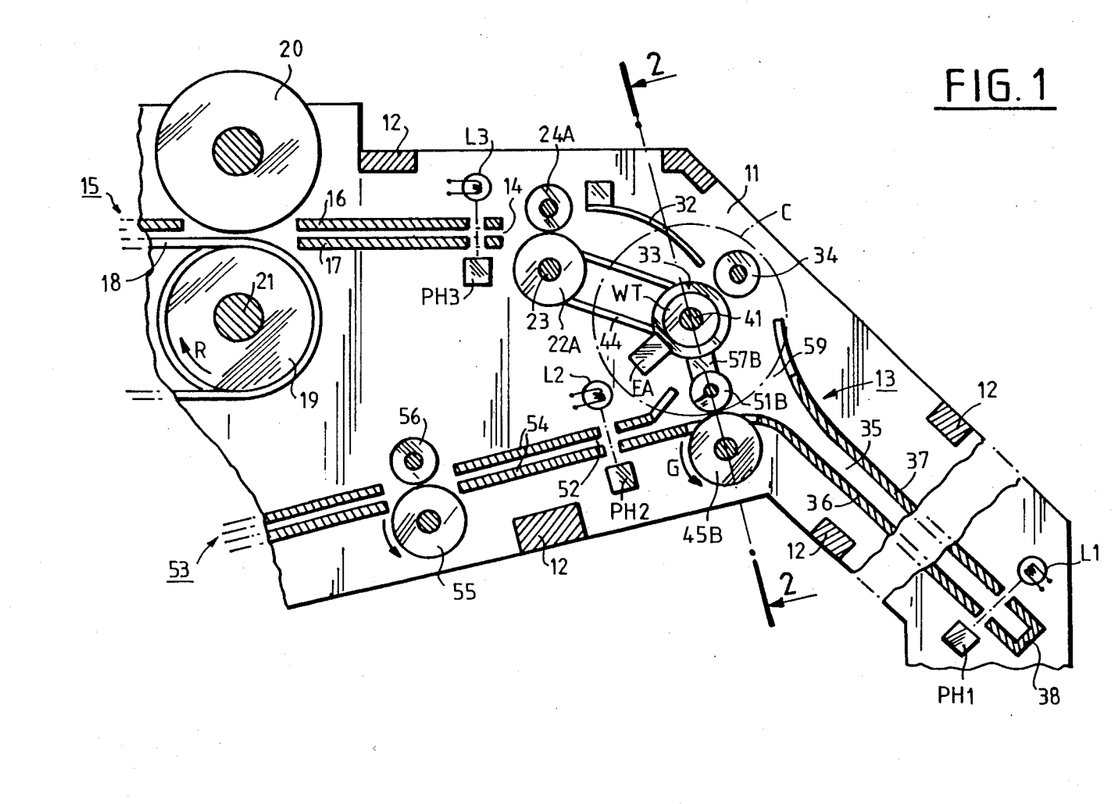
FIG. 1 is a sectional view showing apparatus for temporary storage of flat articles which is arranged in accordance with the invention.

FIG. 1 is a plan view of apparatus for the temporary storage of flat articles that can be used in a wide variety of article processing machines, for example check processing machines, machines for printing sheets of paper, mail sorting machines, recorded card reader/perforators, or other analogous machines. Accordingly, only those elements of the machine that assure the transporting of the articles intended to be held temporarily in this storage apparatus are shown in the drawings that accompany the present description. It will be assumed for purposes of describing the invention that in the example described, the articles comprise sheets of paper.

Figure 2:
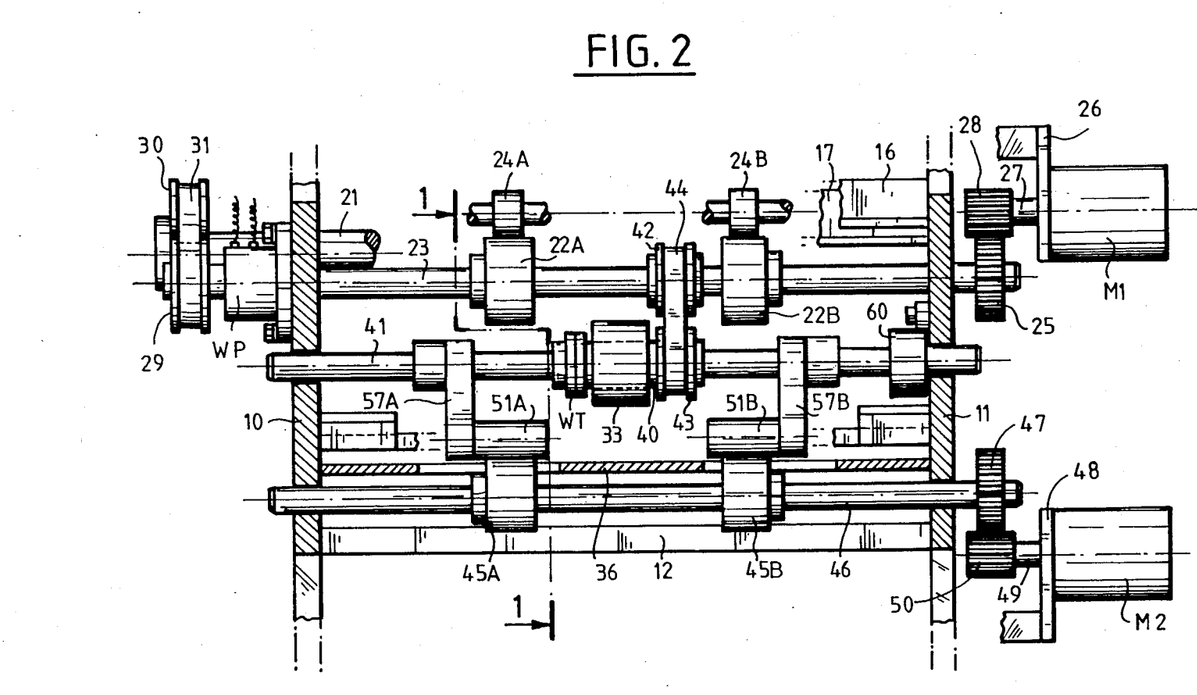
FIG. 2 is a sectional view, taken along the line 2.2 in FIG. 1, showing how the various rollers with which the storage apparatus of FIG. 1 is equipped are coupled.

The machine that is shown in part in FIGS. 1 and 2 includes a rigid frame comprising two vertical support plates 10 and 11, which are interconnected by struts 12 fixed to the two plates in such a manner as to comprise a stable assembly. Storage apparatus 13, which will be described a little later, is shown on the inside of this frame. The storage apparatus serves to temporarily contain sheets of paper furnished one at a time at the exit 14 of a first sheet-feed track 15. In the example described, this track 15, part of which is shown in FIG. 1, includes two guide plates 16 and 17 mounted between the support plates 10 and 11 and one conveyor belt 18 which is stretched over drive rollers, of which only one, 19, is shown in FIG. 1. Pressure rollers, such as the one shown at 20 in the drawing, are disposed along the belt 18 in such a manner that each of the sheets located in the track 15 is kept constantly constrained between the conveyor belt 18 and the at least one of these pressure rollers. The drive roller 19 is integrally connected to a shaft 21, which is supported by the support plates 10 and 11 and which can be driven in rotation in the direction represented by the arrow R, in a manner to be described hereinafter. In FIG. 2, these rollers and the conveyor belt 18 have intentionally not been shown in their entirety, for the sake of simplification.

When the drive roller 19 is driven in rotation in the direction of the arrow R, the sheets that are applied to the belt 18 by the pressure rollers are driven along the track 15, in the direction that extends from left to right as seen in FIG. 1. Each of these sheets is transported between the two plates 16 and 17 and then as shown in FIG. 2 travels over two drive rollers 22A and 22B, which are integrally connected to a common drive shaft 23 and are disposed at the exit 14 of the track 15, as shown in FIG. 1. Two pressure rollers 24A and 24B, each of which is associated respectively with each of the rollers 22A and 22B, enable each sheet to be kept firmly applied to these drive rollers 22A and 22B during its travel over them.

FIG. 2 shows that the drive shaft 23 is supported by the support plates 10 and 11 and that it is provided with a toothed wheel 25 at one of its ends. A motor M1 is fixed on a plate 26 that is integrally connected to the frame of the machine. The shaft 27 of motor M1 is provided with a pinion 28 which meshes with the toothed wheel 25. FIG. 2 makes it possible to understand that the shaft 21 of the drive roller 19 can be driven in rotation because of a mechanical connection that includes two pulleys 29 and 30 and one belt 31 stretched over the two pulleys. Pulley 29 is disposed at the other end of the shaft 23 and is coupled to the shaft 23 via a clutch WP. The pulley 30 is fixed to one end of the shaft 21. In the example described, the clutch WP is an electromagnetic clutch of a known type. Here, it is assumed that this clutch is similar to the one which is additionally described in French Patent No. 949.738 filed on July 18, 1947 by the company known as Compagnie des Machines Bull, and in which a motor shaft rotating continuously is provided with a cylindrical magnetic circuit in the body of which an excitation coil is housed, which when excited causes the attraction of a friction disk that is fixed against relative rotation to a drive shaft. It is also assumed that in the example described, the motor M1 is excited permanently when the machine is started up. Under these conditions, when the clutch WP is excited by an electric current, the shaft 21 is coupled to the shaft 23 via the excited clutch WP, the pulleys 29 and 30 and the belt 31, such that the two shafts 21 and 23 are driven to rotate in the same direction by the electric motor M1. The direction of rotation of these shafts is indicated by the arrow R in FIG. 1. It should be noted to this end that the diameters of the pulleys 29 and 30 are selected such that a sheet that comes to be engaged between the rollers 22A and 24A, on the one hand, and the rollers 22B and 24B, on the other, is driven by them at the same speed with which it was driven by the conveyor belt 18. Contrarily, when the clutch WP is not excited, the shaft 21 is uncoupled from the shaft 23, which subsequently is the only one that continues to be driven in rotation by the motor M1. Because of this, when a sheet fed by the conveyor belt 18 is engaged between the rollers 22A and 24A, on the one hand, and the rollters 22B and 24B, on the other, this sheet continues to be driven by these rollers, even if at that particular moment the clutch WP should cease to be excited.

As shown in FIG. 1, the driven sheet is shunted from its path by a deflector bar 32, so as to be engaged between a drive roller 33 and a pressure roller 34. Since as will be seen below the drive roller 33 is driven to rotate continuously, this sheet is introduced into a storage pocket 35, which in the example described is disposed obliquely with respect to the feed track 15, as shown in FIG. 1. This pocket 35 comprises a lower plate 36, an upper plate 37 and a stop plate 38 against which the front edge of this sheet comes to be applied when the sheet, having been freed by the rollers 33 and 34, drops inside this pocket. The plates 36, 37 and 38 are disposed between the support plates 10 and 11 and are fixed to them in a known manner.

Figure 5:
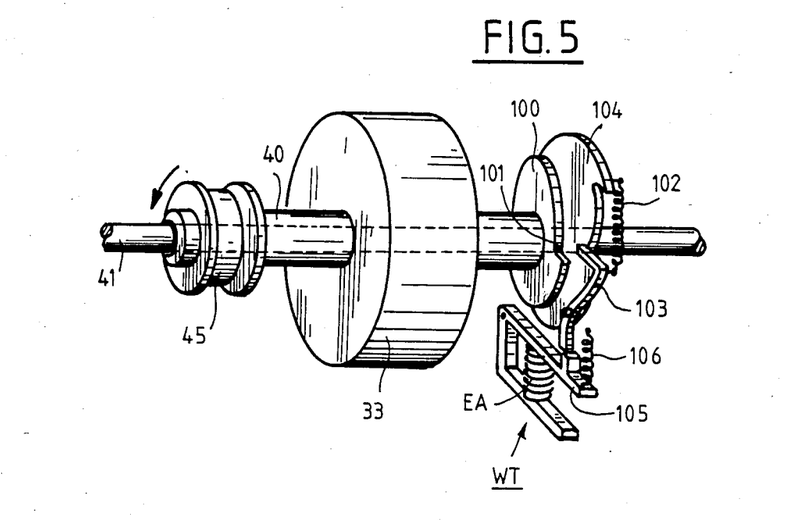
FIG. 5 is a view on a larger scale showing a detail of the shaft coupling mechanism that is used in the storage apparatus shown in FIGS. 1 and 2.

The deflector bar 32 and the pressure roller 34 have not been shown in FIG. 2, for the sake of better illustrating how the roller 33 is driven in rotation. As can be seen in FIGS. 2 and 5, the roller 33 is integrally connected to a sleeve 40, which in turn is threaded onto a shaft 41 supported by the support plates 10 and 11. The sleeve 40 is driven in rotation about the axis 41 by two pulleys 42 and 43 and a belt 44 stretched over these two pulleys. The pulley 42 is fixed on the drive shaft 23 while the other pulley 43 is fixed on sleeve 40. Thus the roller 33 is driven in continuous rotation by the motor M1, via the shaft 23, the pulley 42, the belt 44, the pulley 43 and the sleeve 40.

Once a sheet has been introduced into the storage pocket 35, it can be removed from the pocket in a manner to be explained below, with the aid of two removal rollers 45A and 45B which, as FIG. 2 shows, are fixed to a shaft 46 supported by the support plates 10 and 11. Each of these rollers is lined on its outer surface with a layer of friction material, such as synthetic rubber, for example. The shaft 46 is provided with a toothed wheel 47 on one of its ends. A motor M2 is fixed to a plate 48 that is integrally connected to the frame of the machine. Under these conditions, when the motor M2 is excited, the shaft 46 and the two removal rollers 45A and 45B are driven in rotation in a direction indicated in FIG. 1 by the arrow G. As FIGS. 1 and 2 show, the two rollers 45A and 45B, which are disposed on the outside of the pocket 35 next to the lower plate 36, travel across an opening in this plate such as to protrude into the interior of the pocket 35 and enable a sheet stored previously in the pocket to be put in contact with the two rollers. Two pressure rollers 51A and 51B, which will be described hereinafter, each cooperate respectively with each of the removal rollers 45A and 45B to enable a sheet that is held between these rollers, in a manner to be described below, to be removed from the pocket 35 when the motor M2 is excited. The sheet is then engaged at the entrance 52 of a second sheet-feed track 53. The particular construction of this second track 53 need not be specified here but in a known manner includes guide plates, such as 54, and drive rollers, such as 55, which are associated with pressure rollers, such as 56, these drive rollers being made to rotate by a motor (not shown) in a direction such that a sheet engaged between one of these drive rollers and one of these pressure rollers is displaced in a direction which extends from right to left as seen in FIG. 1.

Each of the pressure rollers 51A and 51B is mounted loosely on a hinge pin and supported parallel to the shaft 41 and is fixed on an arm, respectively 57A and 57B, that is integrally connected to this shaft 41. It will also be understood that if the shaft 41 is made to rotate in the support plates 10 and 11, then the two arms 57A and 57B and the two rollers 51A and 51B that they carry will revolve around this shaft 41, moving into sufficiently large openings made in the plates 36, 37 and 54.

In FIG. 1, the path taken by the roller 51B in the course of this movement has been represented by a circular line C drawn in dot-dash lines. In FIGS. 1 and 2, the two arms 57A and 57B and the two rollers 51A and 51B are shown in a position, called the position of repose, in which each of the two pressure rollers 51A and 51B is in contact, respectively, with each of the two removal rollers 45A and 45B. The shaft 41 can be driven in rotation by the sleeve 41 with the aid of a one-stop electromagnetic clutch WT, which is shown in detail in FIG. 5.

Turning to FIG. 5, it will be apparent that the sleeve 40, which is driven in continuous rotation, is provided with a disk 100 having a notch 101 that under the influence of a spring 102 can be engaged by a pawl 103, which is pivotably attached to a disk 104 fixed on the shaft 41. This pawl 103 is normally kept out of engagement with this notch 101 by means of a hook 105 that is integrally connected to the movable armature of an electromagnet EA. Hook 105 is kept in engagement with the pawl 103 under the influence of a spring 106 that urges this movable armature away from the excitation coil of this electromagnet. When this coil is excited, the movable armature is attracted by this coil, stretching the spring 106 and freeing the pawl 103, which under the influence of its spring 102 can engage the notch 101 and thereby cause the shaft 41 to be driven. The excitation of this coil ceases before this shaft 41 executes one rotation. Because of this cessation of excitation, the hook 105 resumes its initial position, so that the pawl 103, before having executed one rotation, is restrained from moving by the hook 105 that disengages it from the notch 101, thus effecting uncoupling from the sleeve 40 and from the shaft 41. In order that the shaft 41, once it is uncoupled, will not be urged to rotate by the sleeve 40 by slight friction exerted by the sleeve on this shaft, the shaft 41 is provided with a permanent brake 60, as shown in FIG. 2, which being fixed on the support plate 11 generates a resistive mechanical moment strong enough to overcome the action of these frictional forces and thus enable the pressure rollers 51A and 51B to remain in contact with the removal rollers 45A and 45B when the shaft 41 is uncoupled from the sleeve 40.

The temporary storage device shown in FIG. 1 also includes detection devices that enable the travel of the sheets to be detected after having been fed along the first track 15 and stored temporarily in the pocket 35 and then removed from this pocket in order to be driven along the second track 53. In the example described, each of these detection devices comprises a photoelectric cell, such as PH3, which normally receives a beam of light emitted by a light source, such as L3, and which in response to the reception of this beam generates an electrical voltage at its output. This electrical voltage disappears each time a sheet that is engaged between the cell and the light source intercepts this beam. In FIG. 1, three detection devices are shown: the first one (comprising a cell PH3 and a lamp L3) is placed near the exit 14 of the first track 15; the second one (comprising a cell PH1 and a lamp L1) is installed in the portion of the pocket 35 located near the stop plate 38; and the third one (comprising a cell PH2 and a lamp L2) is located near the entrance 52 of the second track 53.

Figure 3:
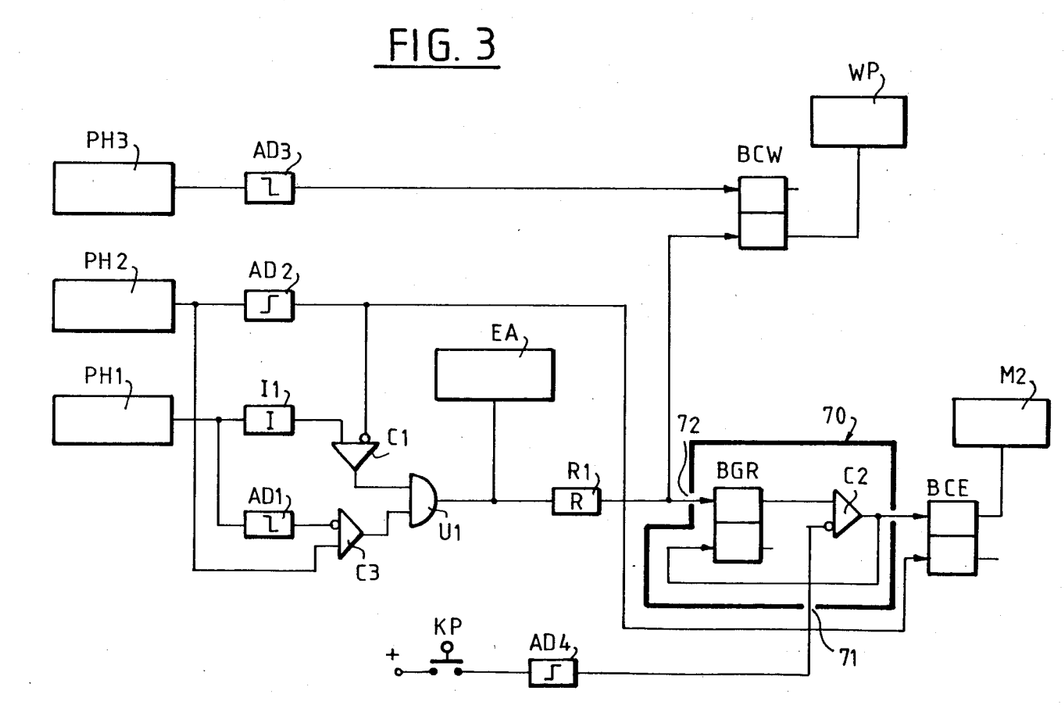
FIG. 3 is a detailed diagram of the circuits used to control the functioning of the storage apparatus of FIG. 1.

Referring now to FIG. 3, the logic layout of the circuits used to control the function of the storage apparatus shown in FIGS. 1 and 2 will now be described. As FIG. 3 shows, this layout includes an OR circuit U1, an inverter circuit I1 and three control circuits C1, C2 and C3, all of them being of a known type. Each of these control circuits is analogous to those additionally described and shown in French Patents No. 1.342.787 and 1.387.085. Each control circuit includes two inputs, one of which, represented in this figure by a small circle, is a conditioned input to which pulses to be transmitted are applied and the other of which is a conditioning input to which an electrical voltage is applied. It should further be remembered that each control circuit transmits an electrical pulse applied to its conditioned input only if its conditioning input is connected to a positive potential.

In FIG. 3, bistable elements, commonly known as flip-flops or multivibrators, are also shown. Each multivibrator, for instance the multivibrator BCW, has one "normal" input, one "complementary" input, one "normal" output, and one "complementary" output, and moves to or remains in the "1" state each time it receives a pulse via its "normal" input and to the "0" state each time it receives a pulse via its complementary input.

Figure 6:
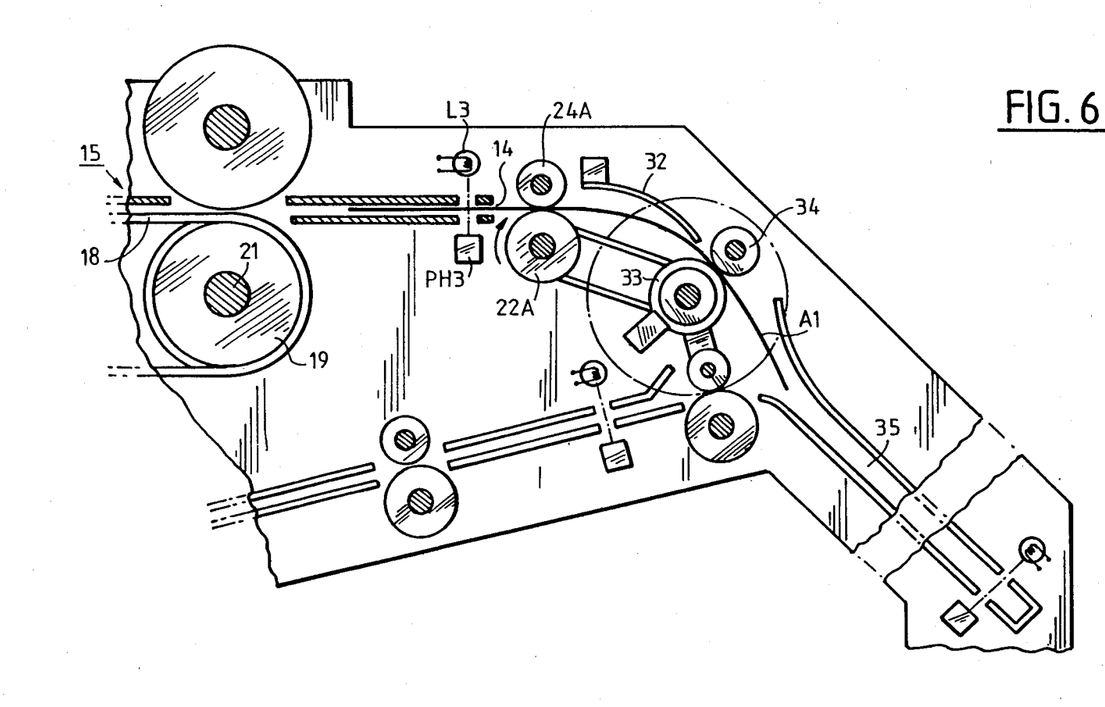
FIGS. 6–10 illustrate various phases in the function of the storage apparatus shown in FIGS. 1 and 2.
Figure 7:
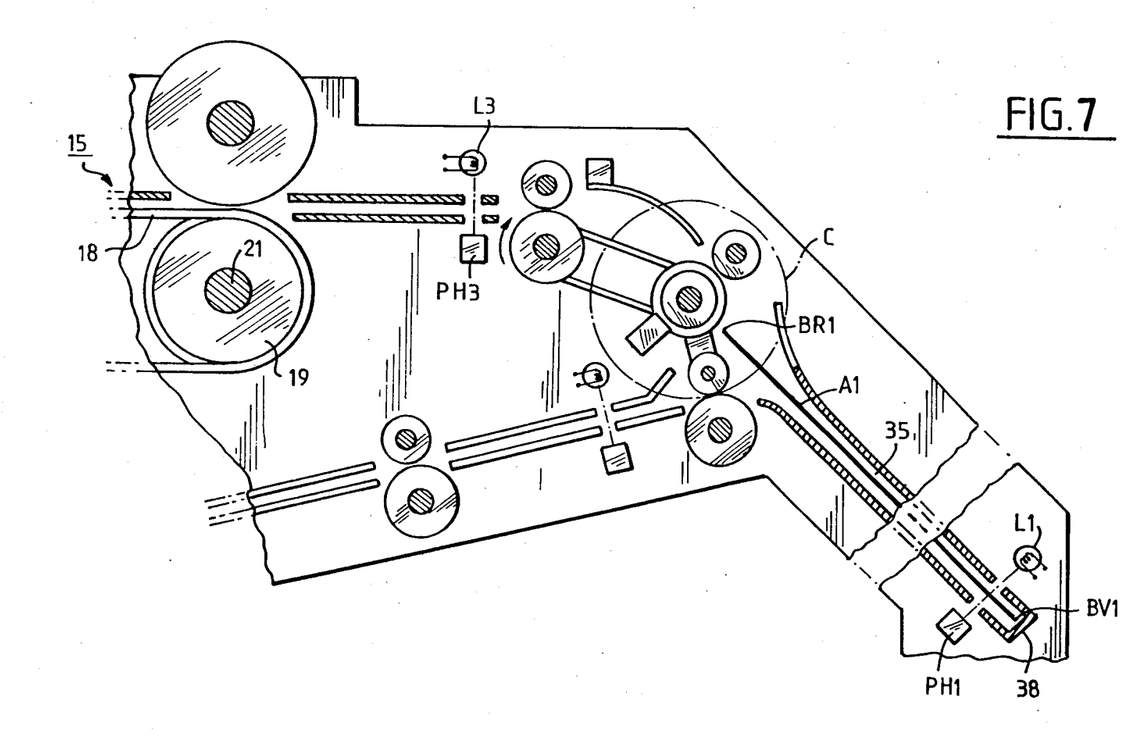

It will be assumed that initially no sheet is stored in the storage pocket 35 and that the three multivibrators BCW, BCR and BCE that are shown in FIG. 3 are in the "0" state. Under these conditions, a positive voltage is present at the "complementary" output of each of these multivibrators. The positive voltage that exists at the "complementary" output of the multivibrator BCW is applied to the clutch WP, which has the effect of exciting this clutch and thus making the shaft 21 integrally connected for rotation with the shaft 23. Because of this, the shaft 21 is driven in rotation by the motor M1, via the shaft 23, the excited clutch WP, the pulleys 29 and 30 and the belt 31. If after that a sheet is engaged in the track 15, then this sheet is driven along this track by the conveyor belt 18 in the direction extending from left to right as seen in FIG. 1. In the course of this movement, this sheet then finally intercepts the beam of light emitted by the lamp L3 and sent to the cell PH3. Because of this, the positive electrical voltage that was present until then at the output of this cell and that was applied to the input of an amplifier-drifter AD3 (see FIG. 3) disappears. This amplifier-drifter is designed to furnish a single electrical pulse at its output each time its input ceases to be connected to a positive potential. Because of the disappearance of the electrical voltage at the output of the cell PH3, the amplifier-drifter AD3 thus furnishes an electrical pulse and applies it to the "normal" input of the multivibrator BCW. This multivibrator then moves to the "1" state, with the effect that the positive voltage that was present until then at the "complementary" output of this multivibrator disappears. Under these conditions, the clutch WP is de-energized and no longer allows the shaft 21 and the roller 19 to be driven in rotation by the shaft 23, even if the conveyor belt 18 stops. However, it should be pointed out that because of the delays in the functioning of the circuits or the delay imparted by a delay element (not shown) that may perhaps be disposed between the amplifier-drifter AD3 and the multivibrator BCW, the de-energizing of the clutch WP is not brought about until after the sheet that has traveled before the cell PH3 has already been engaged between the rollers 22A and 24A, on the one hand, and the rollers 22B and 24B, on the other. As a result, this sheet, which is shown at A1 in FIG. 6, is driven by these rollers and then, being deviated by the deflecting bar 32, is engaged between the rollers 33 and 34, which dive it in turn, directing it toward the storage pocket 35, as shown in FIG. 6. After having passed all the way between rollers 33 and 34, this sheet A1, freed from these rollers, drops into the storage packet 35, its front edge BV1 coming into contact with the stop plate 38, as FIG. 7 shows. In this position, the rear edge BR1 of the sheet A1 is located inside the circle C, which as noted above represents the path described by each of the pressure rollers 51A and 51B when the shaft 41 is driven in rotation.

It can be seen in FIG. 7 that as soon as the sheet A1 has finished moving between the lamp L3 and the cell PH3, the beam of light that is sent by this lamp is no longer intercepted by the sheet A1, so that the cell PH3 once again furnishes a positive voltage at its output. However, the reestablishment of this positive voltage at the output of the cell PH3 has no effect at all on the amplifier-drifter AD3, which remains inactive.

Figure 8:
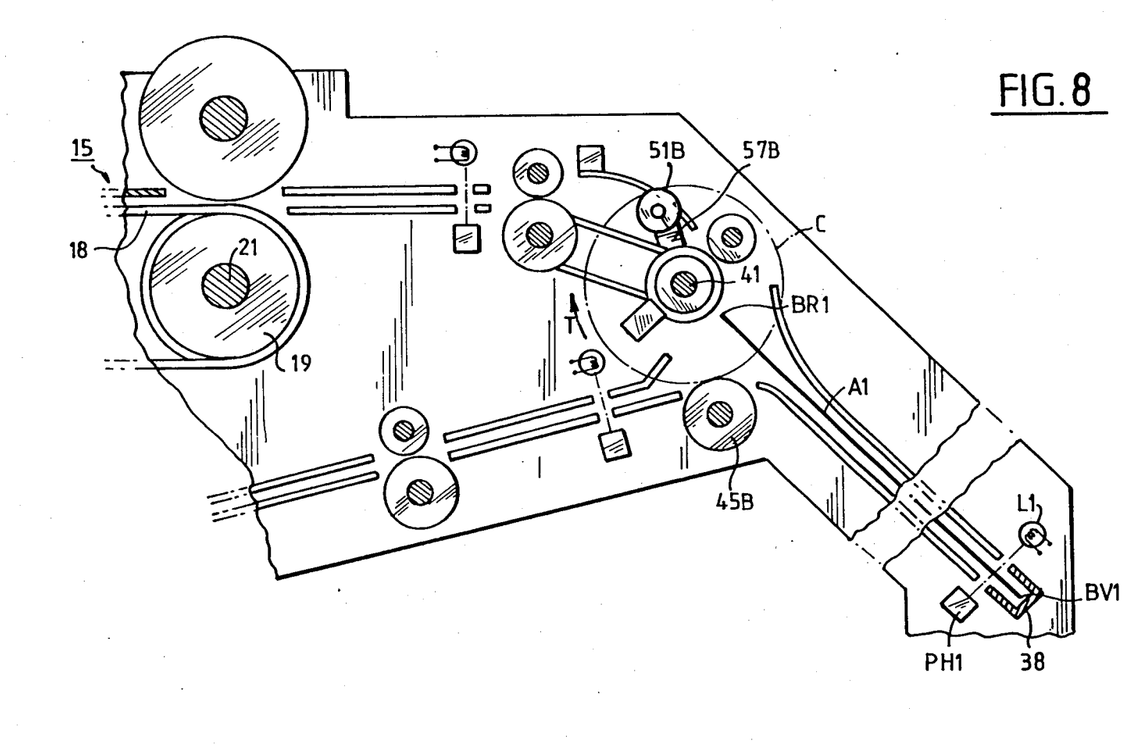
Figure 9:
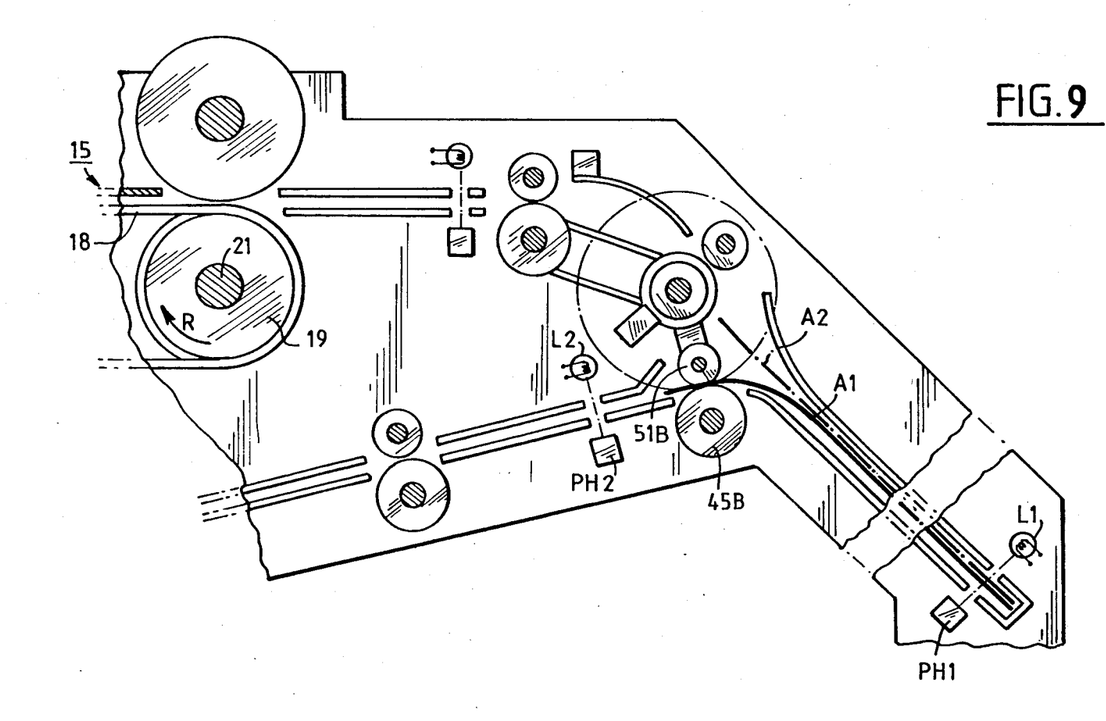

Thus as can be seen in FIG. 7, the sheet A1, by dropping into the storage pocket 35, causes an interception of the beam of light emitted by the lamp L1 and sent to the cell PH1. This interception causes the positive voltage that until then was present at the output of this cell and that was applied to the input of the inverter circuit I1 and of an amplifier-drifter AD1 (FIG. 3) to disappear. As a result, a positive voltage appears at the output of this inverter I1, which makes a control circuit C1 conducting. The conditioning input of this circuit is connected to the output of this inverter. Also, because of the disappearance of the positive electical voltage at its input, the amplifier-drifter AD1, which is the same type as the amplifier-drifter AD3, furnishes a pulse which is then applied to the conditioned input of the control circuit C3. The conditioning input of this control circuit is connected to the output of the cell PH2. Since the beam of light that is sent by the lamp L2 to this cell PH2 is not intercepted, a positive voltage is present at the output of this cell, which makes the control circuit C3 conducting. Under these conditions, the pulse that is generated by AD1 and applied to the conditioned input of the circuit C3 is transmitted by that circuit and applied, via the OR circuit U1, first to the input of a delay element R1, and second to the electromagnet EA of the one-stop clutch WT. As explained in detail above, the momentary excitation of this electromagnet EA has the effect of making the shaft 41 and the sleeve 40 integral with one another for one turn, so that as FIG. 8 shows the assembly comprising the shaft 41, the two arms 57A and 57B and the two rollers 51A and 51B rotate about one turn, in the direction indicated by the arrow T. The two rollers 51A and 51B then leave their position of repose and return there later, after they have executed one complete rotation about the shaft 41. Since the rear edge BR1 of the sheet A1 is located inside the path C described by each of the two rollers 51A and 51B, the two rollers finally, in the course of their movement, come into contact with the sheet A1, and then, pushing against the sheet, apply it against the removal rollers 45A and 45B as shown in FIG. 9, so that when the two pressure rollers 51A and 51B have returned to their position of repose this sheet is engaged between the two rollers 45A and 51A, on the one hand, and between the two rollers 45B and 51B on the other. It should also be noted that this engagement of the sheet between these rollers cannot be attained unless the rollers are disposed correctly, taking into account the length of the sheet; however, this problem will not be addressed here because it is readily solvable by one skilled in the art.

Figure 10:
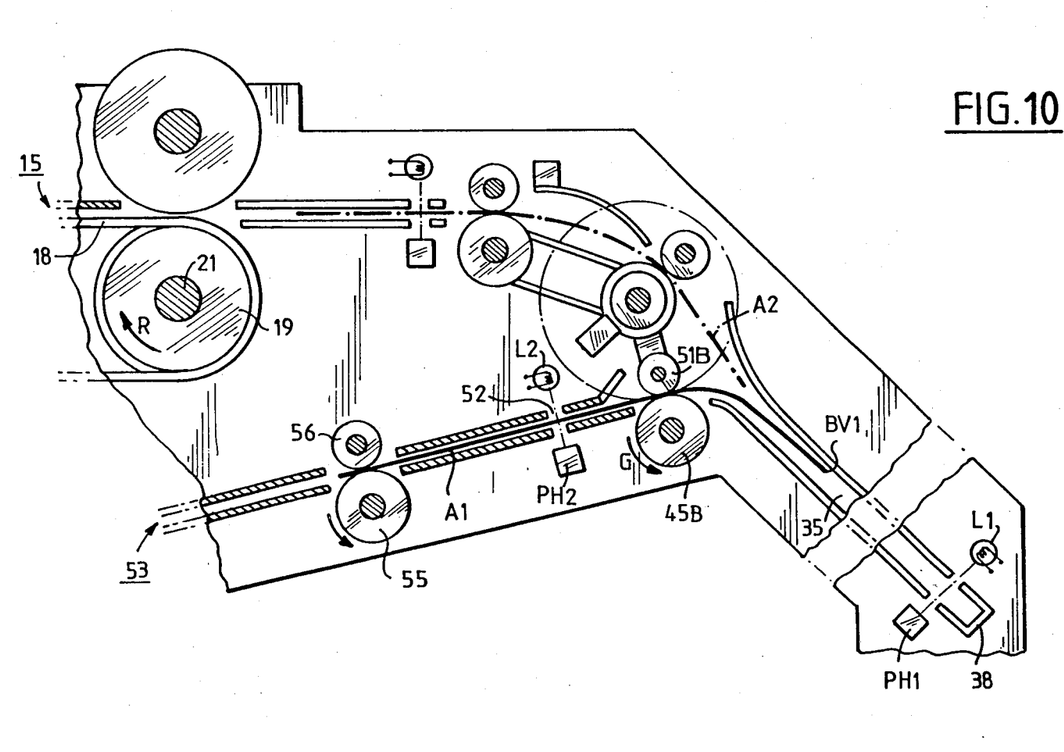

It should now be noted that the delay time of the delay element R1 (FIG. 3) is arranged such that in response to a pulse applied to its input, it furnishes a pulse at its output only when the two rollers 51A and 51B, after having executed a rotation following the pulse applied to the electromagnet EA, have returned to the position of repose. As FIG. 3 shows, the delayed pulse that appears at that moment at the output of the element R1 is applied to both the "complementary" input of the multivibrator BCW, which then returns to the "0" state, and to the "normal" input of the multivibrator BGR, which thus moves to the "1" state. Because of the return of the multivibrator BCW to the "0" state, a positive voltage again appears at the "complementary" output of this multivibrator and is applied to the clutch WP, thus enabling the roller 19 of the belt 18 to be driven in rotation by the drive shaft 23. Moreover, the passage of the multivibrator BGR to the "1" state has the effect of making the control circuit C2, the conditioning input of which is connected to the "normal" output of the multivibrator BGR, conducting. Beginning at that moment, the sheet A1 that is located in the pocket 35 can be removed from it. In the embodiment shown in FIG. 3, this removal is controlled manually by the operator, using a pushbutton KP, which when pressed applies a positive voltage to the input of an amplifier-drifter AD4. This amplifier-drifter is designed to furnish an electrical pulse at its output each time its input is connected to a positive voltage, that is, each time the operator presses the pushbutton KP. This pulse, applied to the conditioned input of the circuit C2 which is now through-connected, is transmitted by the circuit C2 and applied to both the "complementary" input of the multivibrator BGR, which thus returns to the "0" state, and to the "normal" input of the multivibrator BCE, which then moves to the "1" state. Because of the change in state of this multivibrator BCE, a positive voltage appears at the "normal" output of this multivibrator and is applied to the motor M2. The motor M2, thus excited, turns over and drives the removal rollers 45A and 45B in rotation in the direction indicated by the arrow G in FIG. 10. Since the sheet A1 is engaged between the rollers 45A and 51A and between the rollers 45B and 51B, the rollers 45A and 45B force the sheet A1 to leave the pocket 35 and drive it toward the entrance 52 of the track 53. In the course of this movement, the edge BV1 of the sheet A1 (which has now become the rear edge) moves farther way from the stop plate 38, so that after this rear edge BV1 has moved past the cell PH1, this cell is once again illuminated and furnishes a positive voltage at its output. Consequently the amplifier-drifter AD1 remains inactive, while the inverter I1 stops furnishing a positive voltage at its output. The circuit C1 now becomes non-conducting. Furthermore, at the moment where it engages the entrance 52 of the track 53, the sheet A1, which continues to be driven by the rollers 45A and 45B, intercepts the light beam that originates at the lamp L2 and is sent to the cell PH2. As a result the positive voltage that was present until then at the output of this cell and that was applied both to the conditioning input of the circuit C3 and to the input of an amplifier-drifter AD2 disappears, which makes the circuit C3 non-conducting. Meanwhile, because the structure of the amplifier-drifter AD2 is analogous to that of the amplifier-drifter AD4, the disappearance of the positive voltage at the input of this amplifier-drifter AD2 has no effect on it, and it thus remains inactive. Under these conditions, the sheet A1 continues to be displaced by the rollers 45A and 45B and finally is engaged between the rollers 55 and 56 of the track 53, as shown in FIG. 10. In any case, in looking at this figure, it will be understood that just after the passage of the rear edge BV1 of the sheet A1 past the cell PH2, this cell is illuminated once again and furnishes a positive voltage at its output. As a result, the amplifier-drifter AD2 furnishs a pulse at its output and applies it both to the "complementary" input of the multivibrator BCE, which thus returns to the "0" state, and to the conditioned input of the control circuit C1, which since it is no longer conducting blocks the pulse that it receives. Because of the return of the multivibrator BCE to the "0" state, the motor M2 is de-energized and stops driving the removal rollers 45A and 45B in rotation.

It can be noted in the diagram of FIG. 3 that the removal of a sheet stored in the pocket 35 cannot be tripped except beginning at the moment when the multivibrator BGR moves to the "1" state, since this shift of this multivibrator to this state is not brought about except after the rollers 51A and 51B, after having executed one rotation, have returned to the state of repose, so as to wedge this sheet firmly between them and the removal rollers 45A and 45B. It can be observed that the passage of the multivibrator BGR to the "1" state, which is caused by the pulse furnished by the delay element R1, is accompanied by a return to the "0" state on the part of the multivibrator BCW and consequently by a renewed driving of the roller 19 in rotation. Under these conditions, when the sheet A1 is in the position shown in FIG. 9, in which it is ready to be removed from the storage pocket 35, it may well happen that another sheet, driven by the belt 18, will arrive at the exit 14 of the track 15 in order to be sent in its turn to the pocket 35. In that case, this other sheet, by breaking the beam of light that normally falls on the cell PH3, causes a disappearance of the positive voltage at the output of this cell. Consequently the amplifier-drifter AD3 furnishes an electrical pulse and applies it to the "normal" input of the multivibrator BCW, resulting in the de-energizing of the clutch WP and the stoppage of the roller 19 and belt 18. Meanwhile, this other sheet, held by the rollers 22A and 22B, and then by the roller 33, continues to be driven toward the pocket 35, into which it eventually drops. This other sheet, which will hereinafter be identified as sheet A2, then occupies the position in the pocket that is shown in dot-dash lines in FIG. 9; this is a different position from that occupied by the sheet A1, which is engaged between the rollers 45A and 51A and between the rollers 45B and 51B and is ready to be removed from the pocket. At that moment, two sheets A1 and A1 are simultaneously stored in the pocket 35. It is apparent that since the sheet A1 is always located in the pocket 35 at the moment when the sheet A2 drops into it, the arrival of this sheet A1 does not trip any action relating to the function of the cell PH1, which remains unilluminated. Consequently the circuit C1 remains conducting and the amplfier-difter AD1 does not furnish any pulse.

If the operator then presses the pushbutton KP, the amplifier-drifter AD4 furnishes a pulse and applies it to the conditioned input of the circuit C2, which since it is through-connected transmits this pulse and applies it to the "normal" input of the multivibrator BCE and to the "complementary" input of the multivibrator BGR. Because of this, the multivibrator BGR returns to the "0" state, while the multivibrator BCE shifts to the "1" state, thus exciting the motor M2. The motor M2, now that it is excited, then turns over and drives the rollers 45A and 45B in rotation, which forces the sheet A1 to leave the pocket 35. Since the sheet A2 is still stored in the pocket, the light beam sent by the lamp L1 to the cell PH1 continues to be interrupted by this latter sheet, so that the control circuit C1 remains conducting.

The sheet A1 that is removed by the rollers 45A and 45B now, at the moment when it is engaged at the entrance to the track 53, breaks the light beam sent by the lamp L2 to the cell PH2. At that moment, the positive voltage that until then was present at the output of this cell disappears. However, this disappearance does not have any effect on the amplifier-drifter AD2, which remains inactive. On the other hand, this disappearance does make the control circuit C3 non-conducting. When a positive voltage later reappears at the output of the cell PH2, after the passage of the rear edge of the sheet A1 past this cell, the circuit C3 becomes through-connected once again, and the amplifier-drifter AD2 furnishes an electrical pulse. This pulse is applied both to the "complementary" input of the multivibrator BCE, which thus returns to the "0" state and consequently stops exciting the motor M2, and to the conditioned input of the circuit C1, which being conducting transmits the pulse via the circuit U1 to the electromagnet EA and to the input of the delay element R1. From that moment on, these operations that take place are similar to those described earlier herein. Without going into detail, it can be noted simply that in the course of these operations, the assembly comprising the two arms 57A and 57B and the two rollers 51A and 51B executes one rotation, so that at the end of this rotation, the sheet A2 is held engaged between the rollers 45A and 51A and the rollers 45B and 51B, ready to be removed in its turn from the storage pocket 35.

As may be understood from FIG. 10, it can happen that the sheet A2 drops into the storage pocket 35 at a time when the sheet A1, which is beginning to be removed from this pocket, has stopped interrupting the light beam sent to the cell PH1. In this case, because the beam is then broken once again by the sheet A2, the disappearance of the positive voltage at the output of this cell PH1 has the effect of making the circuit C1 through-connected, and of causing a pulse to be emitted by the amplifier-drifter A1. However, since the sheet A1 in the course of being removed has interrupted the beam of light sent to the cell PH2, the disappearance of the positive voltage at that cell has made the circuit C3 non-conducting. Under these conditions, the electrical pulse which is furnished by AD1 and applied to the conditioned input of the circuit C3 is not transmitted by the circuit C3, so that the electromagnet EA is not excited, and the two rollers 51A and 51B remain in the position of repose and allow the sheet A1 to be removed properly from the pocket 35. Not until the rear edge of the sheet A1 passes the cell PH2 are the two rollers 51A and 51B driven in rotation for one turn about the shaft 41. At that moment, in effect, the amplifier-drifter AD2 furnishes a pulse and applies it both to the "complementary" input of the multivibrator BCE, which thus returns to the "0" state and stops exciting the motor M2, and to the conditioned input of the circuit C1, which since it is conducting transmits the pulse via the circuit U1 to the electromagnet EA and to the input of the element R1.

Consequently, the two rollers 51A and 51B are driven in rotation, for one turn, and allow the sheet A2 stored in the pocket 35 to be put into a position in which it is engaged between the rollers 45A and 51A and between the rollers 45B and 51B, where it is thus ready to be removed from the pocket 35.

In FIG. 3, for the sake of simpler naming of elements, the multivibrator BGR and the control circuit C2 have been regrouped inside the same block 70. This block, named the conditioning block, includes a first input 71, which corresponds to the conditioned input of the circuit C2 and is intended to receive the pulses, known as removal commands, which the amplifier-drifter AD4 generates in response to the pressing of the pushbutton KP by the operator. The block 70 also includes a second input 72, which corresponds to the "normal" input of the multivibrator BGR and is intended to receive the delayed pulses furnished by the delay element R1. Finally, the block 70 includes an output 73, which corresponds to the outut of the circuit C2 and is cconnected to the "normal" input of the multivibrator BCE. From the details provided above, it will be understood that the block 70 does not transmit to its output 73 a removal command pulse applied to its input 71 unless a delayed pulse furnished by the element R1 has been applied beforehand to its input 72 to cause the shift of the multivibrator BGR to the "1" state.

In the embodiment shown in FIGS. 1 and 2, the storage apparatus 13 is arranged such that the storage pocket 35 has only a single opening 59, which serves equally well for both the introduction into the pocket of sheets transported by the first track 15 and for the removal, outside this track, of sheets that must then be engaged in the second track 53. The sheets that are removed from such a pocket are driven in the opposite direction from that in which they were being fed when they were introduced into the pocket.

Figure 4:
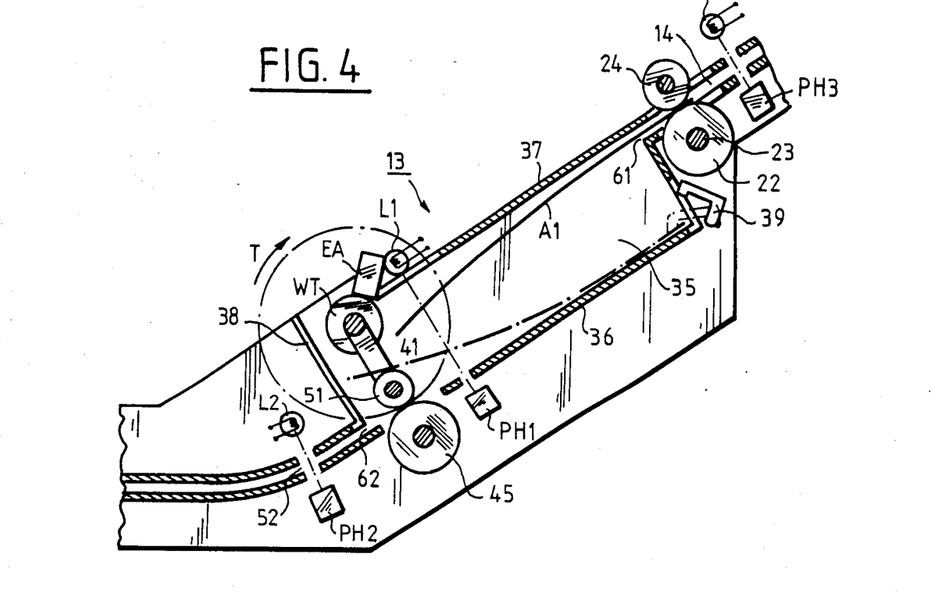
FIG. 4 is a fragmentary schematic view of another embodiment of a storage apparatus according to the invention.

It should be pointed out, however, that this form of storage pocket is not exclusive in the present invention, and that in the case where a reversal of the direction of displacement of the sheets after they have been stored is not desirable, it is also possible to use a storage pocket of the type shown in FIG. 4, which includes two openings 61 and 62, one of which, 61, is located facing the exit 14 of the first track and the other, 62, is located facing the entrance 52 of the second track. The storage apparatus shown in FIG. 4 has major similarities with that shown in FIGS. 1 and 2, and the elements comprising it that are analogous to those of the apparatus described above are identified by the same reference numerals in FIG. 4. However, the two removal rollers 45A and 45B shown in FIG. 2 have been replaced in FIG. 4 by a single removal roller 45. Similarly, the two pressure rollers 51A and 51B have been replaced by a single pressure roller 51. Finally, the two drive rollers 22A and 22B have been replaced in FIG. 4 by a single roller 22. Referring now to the storage apparatus shown in FIG. 4, it is seen that a sheet A1 leaving the exit 14 of the first track and engaged between the rollers 22 and 24 comes to a stop with its front edge against the stop plate 38, and it then drops to assume the position shown in dot-dash lines in FIG. 4. In this position, this sheet comes to rest on the pressure roller 51, which thus prevents it from coming into contact with the removal roller 46. With the aid of a control circuit similar to that shown in FIG. 3, this sheet can then be put into contact with this roller 45 by a single rotation, of one turn, of the roller 51 about the shaft 41, in the direction indicated by the arrow T. So that the sheet, in the course of this movement, will not be urged to leave via the opening 62, a movable gripper 39 is provided, for holding the sheet by its rear edge. At the end of this movement, the sheet is on the lower plate 36 and is engaged between the rollers 45 and 51. From that moment on, it can be driven by the roller 45 and can leave by way of the opening 62 of the pocket so as to be engaged in the entrance 52 of the second track.

It will be understood that the invention is in no manner limited to the embodiments described and shown herein, which are provided solely by way of example. To the contrary, it includes any means comprising technological equivalents of those described and shown, taken individually or in combination, and defined by the following claims.

What is claimed is:

1. Apparatus for temporary storage of flat articles, such as sheets, having storage pocket (35) positioned in a fixed location and facing an exit (14) of a first article-feed track (15) and the entrance (52) of a second article-feed track (53), an adhesion-drive (45A, 45B) contiguous with the pocket and arranged to contact an article stored in the pocket, and applicator means (51A, 51B) comprising at least one roller (51B) loosely mounted on one end of an arm (57B) capable of pivoting about a shaft (41) disposed parallel to the front and rear edges (BV1, BR1) of articles fed along the first and second feed tracks (15 and 53) and being arranged to place this article in contact with the adhesion drive, said drive adhesion being contructed and arranged so that, upon command, it causes the article to be removed from the pocket and engaged in the second track, said applicator means being arranged so that, in the absence of an article in said pocket, it occupies a position of repose in which it is in contact with the adhesion drive, but without impeding the introduction into said pocket of articles fed via the first track, and so that as soon as a single article has been introduced completely into the pocket it momentarily moves away from the position of repose and later returns to said position to thereby allow the article to contact the adhesion drive while preventing another article subsequently arriving at a later time in the pocket from coming into contact with the adhesion drive as long as the article that is in contact with the adhesion drive has not been removed from the pocket, said shaft (41) being integrally connected to the arm (57B) of the applicator means and coupled mechanically to a motor shaft (27) in continuous rotation, via an electrically controlled one-stop clutch (WT), said shaft (41) being further connected to a permanent brake (6) arranged so as to prevent said shaft (41) from being driven in rotation when said shaft is uncoupled from the motor shaft (27), and said arm (57B) is arranged to execute one rotation about the shaft (41) upon the application of an electrical pulse to the one-stop clutch (WT) and further including a first detection means (PH1, AD1) disposed in the storage pocket (35) and arranged to furnish an electrical pulse each time an article fed via the first track (15), when the pocket is empty, is introduced into said pocket, second detection means (PH2, AD2) disposed at the entrance (52) of the second track and arranged to furnish an electrical pulse each time an article that has exited completely from said pocket is engaged in a second track, and switching circuit means (I1, C1, C3, U1) operatively connected to allow said pulses to be applied to the one-stop clutch (WT) solely in the case where said pocket contains only a single article which is not in contact with the adhesion drive (45A, 45B).

2. Apparatus for temporary storage of articles according to claim 1, wherein the first track (15) includes drive means (19, 18) coupled mechanically, via an electrically controlled coupling device (WP), to the continuously rotating motor shaft (27), and further including a bistable switching element (BCW) arranged so that normally it occupies a first state ("0") in which it applies an electrical voltage to said coupling device (WP) so as to bring about the coupling of said drive means (19, 18) to said motor shaft (27), and a third detection device (PH3, AD3) disposed at the exit (14) of the first track and arranged to furnish an electrical pulse each time an article fed via this first track passes before this third detection device, said pulse being applied to said bistable element (BCW) to force this element to be placed in a second state ("1"), such that said coupling device (WP) is then deprived of voltage and causes said motor shaft (27) and said drive means (19, 18) to be uncoupled.

3. Apparatus for temporary storage of articles according to claim 1, further including a delay element (R1) having one input connected to the switching circuit means (I1, C1, C3, U1) to receive the pulses applied to the one-stop clutch (WT), said delay element being arranged so that each time it receives a pulse applied to its input it furnishes a delayed pulse at its output, the delay of this element (R1) being arranged such that the delayed pulse appears at its output only when, following a pulse applied to said one-stop clutch (WT), the shaft (41) that is integrally connected to the arm of the applicator device has executed one complete rotation, said delayed pulse being applied to the bistable switching element (BCW), to return this element to its first state ("0") and thus to allow this element once again to apply an electrical voltage to the coupling device (WP).

4. Apparatus for temporary storage of articles according to claim 3, further including a motor (M2) coupled mechanically to the adhesion-drive device (45A, 45B) so that when it is excited it will drive said device and force an article which has been applied to said adhesion drive device to be removed from the pocket (35), and a second bistable switching element (BCE) connected to said motor (M2) and arranged so that normally it occupies a first state ("0") in which the motor is without a driving control voltage, this second bistable element (BCE) being capable of being placed in a second state ("1") in order to apply an electrical driving control voltage to said motor and thus cause the motor to drive the adhesion-drive device.

5. Apparatus for temporary storage of articles according to claim 4, further including a conditioning block (70) including a first input (71) arranged to receive a removal command pulse, a second input (72) arranged to receive the pulses furnished to the output of the delay element (R1), and an output (73) connected to the second bistable element (BCE) in order to apply to it a pulse that has the effect of placing it in its second state ("1"), said conditioning block being arranged so as not to transmit to its output a removal control pulse applied to its first input except when it has previously received, via its second input, a pulse originating in said delay element (R1).

6. Apparatus for temporary storage of flat articles, such as sheets, comprising:
 (a) a storage pocket (35) positioned in a fixed location and facing an exit (14) of a first article-feed track (15) and the entrance (52) of a second article-feed track (53);
 (b) an adhesion-drive device (45A, 45B) contiguous with the pocket and arranged to contact an article stored in the pocket;
 (c) at least one roller (51B) loosely mounted on one end of an arm (57B) capable of pivoting about a shaft (41) disposed parallel to the front and rear edges (BV1, BR1) of articles fed along said first and second feed tracks (15 and 53), said shaft (41) being coupled mechanically to a motor shaft (27) in continuous rotation, via an electrically controlled one stop clutch (WT), said arm (57B) being arranged so that, in the absence of an article in said pocket, it occupies a position of repose in which said roller (51B) is in contact with the adhesion drive (45A, 45B), but without impeding the introduction into said pocket of articles fed via the first track, while, upon the application of an electrical pulse to said one-stop clutch (WT), it executes one rotation above said shaft (41);
 (d) first detection means (PH1, AD1) disposed in said first storage pocket (35) and arranged to furnish an electrical pulse to said clutch each time an article fed via the first track (15), when the pocket is empty, is introduced into said pocket, so that said arm (57B) executes one rotation about said shaft (41) and thereby allows said article to contact the drive device;
 (e) second detection means (PHl, AD2) disposed at the entrance (52) of the second track and arranged to furnish an electrical pulse each time an article that has exited completely from said pocket is engaged in said second track; and
 (f) switching circuit means (I1, C1, C3, U1) operatively connected to allow said pulses to be applied to said clutch (WT) solely in the case where said pocket contains only a single article which is not in contact with the drive device (45A, 45B).

7. Apparatus for temporary storage of articles according to claim 6, wherein the first track (15) includes drive means (19, 18) coupled mechanically, via an electrically controlled coupling device (WP), to the continuously rotating motor shaft (27), and further including a bistable switching element (BCW) arranged so that normally it occupies a first state ("0") in which it applies an electrical voltage to said coupling device (WP) so as to bring about the coupling of said drive means (19, 18) to said motor shaft (27), and a third detection device (PH3, AD3) disposed at the exit (14) of the first track and arranged to furnish an electrical pulse each time an article fed via this first track passes before this third detection device, said pulse being applied to said bistable element (BCW) to force this element to be placed in a second state ("1"), such that said coupling device (WP) is then deprived of voltage and causes said motor shaft (27) and said drive means (19, 18) to be uncoupled.

8. Apparatus for temporary storage of articles according to claim 7, further including a delay element (R1) having one input connected to the switching circuit means (I1, C1, C3, U1) to receive the pulses applied to the one-stop clutch (WT), said delay element being arranged so that each time it receives a pulse applied to its input it furnishes a delayed pulse at its output, the delay of this element (R1) being arranged such that the delayed pulse appears at its output only when, following a pulse applied to said one-stop clutch (WT), the shaft (41) that is integrally connected to the arm of the applicator device has executed one complete rotation, said delayed pulse being applied to the bistable switching element (BCW), to return this element to its first state ("0") and thus to allow this element once again to apply an electrical voltage to the coupling device (WP).

9. Apparatus for temporary storage of articles according to claim 8, further including a motor (M2) coupled mechanically to the adhesion-drive device (45A, 45B) so that when it is excited it will drive said device and force an article which has been applied to said adhesion drive device to be removed from the pocket (35), and a second bistable switching element (BCE) connected to said motor (M2) and arranged so that normally it occupies a first state ("0") in which the motor is without a driving control voltage, this second bistable element (BCE) being capable of being placed in a second state ("1") in order to apply an electrical driving control voltage to said motor and thus cause the motor to drive the adhesion-drive device.

10. Apparatus for temporary storage of articles according to claim 9, further including a conditioning block (70) including a first input (71) arranged to receive a removal command pulse, a second input (72) arranged to receive the pulses furnished to the output of the delay element (R1), and an output (73) connected to the second bistable element (BCE) in order to apply to it a pulse that has the effect of placing it in its second state ("1"), said conditioning block being arranged so as not to transmit to its output a removal control pulse applied to its first input except when it has previously received, via its second input, a pulse originating in said delay element (R1).

* * * * *

UNITED STATES PATENT AND TRADEMARK OFFICE
CERTIFICATE OF CORRECTION

PATENT NO. : 4,804,175
DATED : February 14, 1989
INVENTOR(S) : GRANDJEAN

It is certified that error appears in the above-identified patent and that said Letters Patent is hereby corrected as shown below:

In Col. 15, line 46, before "storage pocket" delete "first".

Signed and Sealed this

Third Day of April, 1990

Attest:

HARRY F. MANBECK, JR.

*Attesting Officer*      *Commissioner of Patents and Trademarks*